(12) United States Patent
Nonaka

(10) Patent No.: US 7,787,019 B2
(45) Date of Patent: Aug. 31, 2010

(54) CAMERA AND SHOOTING CONTROL METHOD THEREFOR

(75) Inventor: Osamu Nonaka, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 693 days.

(21) Appl. No.: 11/788,680

(22) Filed: Apr. 19, 2007

(65) Prior Publication Data
US 2007/0279498 A1 Dec. 6, 2007

(30) Foreign Application Priority Data
Apr. 27, 2006 (JP) .............................. 2006-124474
Feb. 13, 2007 (JP) .............................. 2007-032226

(51) Int. Cl.
*H04N 5/235* (2006.01)
*H04N 5/225* (2006.01)
(52) U.S. Cl. ................................. 348/221.1; 348/220.1
(58) Field of Classification Search .............. 348/220.1, 348/221.1
See application file for complete search history.

(56) References Cited

U.S. PATENT DOCUMENTS

| 7,236,194 | B2 * | 6/2007 | Kawakubo ................... 348/272 |
| 7,292,280 | B2 * | 11/2007 | Yamazaki et al. ............ 348/363 |
| 2003/0052979 | A1 * | 3/2003 | Soga et al. ................... 348/241 |
| 2003/0086005 | A1 * | 5/2003 | Nakamura ................ 348/223.1 |
| 2004/0130642 | A1 * | 7/2004 | Imamura et al. ............ 348/311 |
| 2006/0147192 | A1 | 7/2006 | Zhang et al. |
| 2006/0256203 | A1 * | 11/2006 | Honma ..................... 348/220.1 |

FOREIGN PATENT DOCUMENTS

| CN | 1642233 | 7/2005 |
| JP | 11-215429 | 8/1999 |
| JP | 2004-064467 | 2/2004 |
| JP | 2004-159265 | 6/2004 |
| JP | 2005-057378 | 3/2005 |

OTHER PUBLICATIONS

Chinese Office Action to Chinese Patent Application No. 2007101047575, dated Jun. 27, 2008 (8 pgs.) with translation (10 pgs.).
Office Action for Chinese Patent Application No. 2007101047575, mailed Aug. 14, 2009 (9 pgs.) with translation (8 pgs.).

* cited by examiner

*Primary Examiner*—James M Hannett
(74) *Attorney, Agent, or Firm*—Straub & Pokotylo; John C. Pokotylo

(57) ABSTRACT

Disclosed is a camera which analyzes an image signal output periodically from an image pickup device to determine a timing suitable for shooting a still image, and acquires an image signal for a still image having a larger number of pixels based on the determination result. The suitable timing can be determined by using a moment of, for example, a change in the moving direction of a moving subject, a pausing of a moving subject, or a change in a voice to be input. The image signal for a still image can stay recorded only when a camera user gives an instruction to shoot a still image within a predetermined period from the determination.

20 Claims, 5 Drawing Sheets

CAMERA AND SHOOTING CONTROL METHOD THEREFOR

CROSS REFERENCES TO RELATED APPLICATION

This application is based upon and claims the benefit of priority from prior Japanese Patent Application Nos. 2006-124474, filed on Apr. 27, 2006, and 2007-032226, filed on Feb. 13, 2007, the entire contents of which are incorporated herein by reference.

BACKGROUND OF THE INVENTION

1. Field of the Invention

The present invention relates to a digital camera, and, more particularly, to a camera capable of shooting a still image at a shutter timing determined by the camera.

2. Description of the Related Art

In the recent camera market, improvements on image pickup sensors such as a CCD (Charge Coupled Device) can ensure fast reading of a large amount of image signals in a short period of time. Conventional large-pixel image pickup devices of, for example, 5 million pixels or greater have a reading speed of several tens of milliseconds. However, some image pickup devices that can read image signals at 60 fps (frame per second) have been proposed recently.

Accordingly, there are many digital cameras designed for shooting still images merchandised which can also shoot movie images too. Also on the market are a lot of movie cameras for shooting movie images which can take an improved image quality of still images.

For example, Japanese Patent Application Laid-Open No. 2004-64467 describes a camera capable of acquiring a smooth movie image even if a still image is shot with an electronic flash fired during shooting of the movie image. This camera drives an image pickup at a frame rate double of the frame rate necessary to capture a movie image. In a case of shooting a still image, the camera reads a frame for recording a still image between frames for recording a movie image. The electronic flash is fired during the light reception period for the still-image recording frame.

Japanese Patent Application Laid-Open No. 2005-57378 describes an imaging device capable of shooting a high-quality still image as well as shooting a movie image at a high frame rate. This imaging device records image data output from an image pickup device driven in thin reading mode, as a movie image, and records image data output from the image pickup device driven in full-pixel reading mode, as a still image.

Recently, various fast CMOS (Complementary Metal Oxide Semiconductor) sensors and circuits which are designed as compatible therewith to ensure fast acquisition of pixel signals have been realized. So have been proposed cameras for recording a movie image and a still image using such a fast-reading image pickup device.

BRIEF SUMMARY OF THE INVENTION a camera of this invention analyzes an image signal output periodically from an image pickup device to determine a timing suitable for shooting a still image, and acquires an image signal for a still image having a larger number of pixels than that of the periodically output image signal based on the determination result.

As an exemplary structure of a camera according to the present invention, a camera comprises a determination part that determines a shooting timing suitable for a still image using an image signal output from an image pickup device at approximately a constant period; a selection part that selects a number of pixels to be read from the image pickup device; and a control part that controls the selection part in such a way that the selection part selects the number of pixels larger than a number of pixels of the image signal output from the image pickup device at approximately a constant period when the determination part determines that the shooting timing is suitable for a still image.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

A preferred embodiment of the invention is described below with reference to the accompanying drawings.

Referring to FIGS. 1 to 5, the embodiment of the invention will be explained. In the embodiment, a still image is shot at an adequate (suitable) timing using a camera capable of shooting a still image by interruption during movie shooting.

To provide a fair picture for a still image, it is desirable to shoot the still image at the exact timing (decisive moment). To acquire a still image which provides an appreciative print thereof, it is desirable that the still image should consist of multiple pixels fully using the number of pixels of the image pickup device. To shoot a still image with multiple pixels, it takes relatively a long time in reading image signals and image processing thereof. Further, to fit the decisive moment on the frame of a print or the like at the time of shooting a still image, the focus and exposure need to be adjusted more accurately for a still image than a movie image.

There is an upper limit to the number of pixels of a movie image that can be handled by the standards (NTSC, high vision or the like) of display devices. In a case of using an image pickup device having a greater number of pixels than the upper limit, not all the pixels of the image pickup device should be used. Because an importance of a movie image is on its smooth movement and there are not much demands of catching a decisive moment, it is simply necessary to read image signals from the image pickup device fast and regularly.

The embodiment takes those demands into account, and a description will be given below of the camera of the embodiment that can shoot a still image while shooting a movie image at a timing which is considered adequate.

Figure 1:
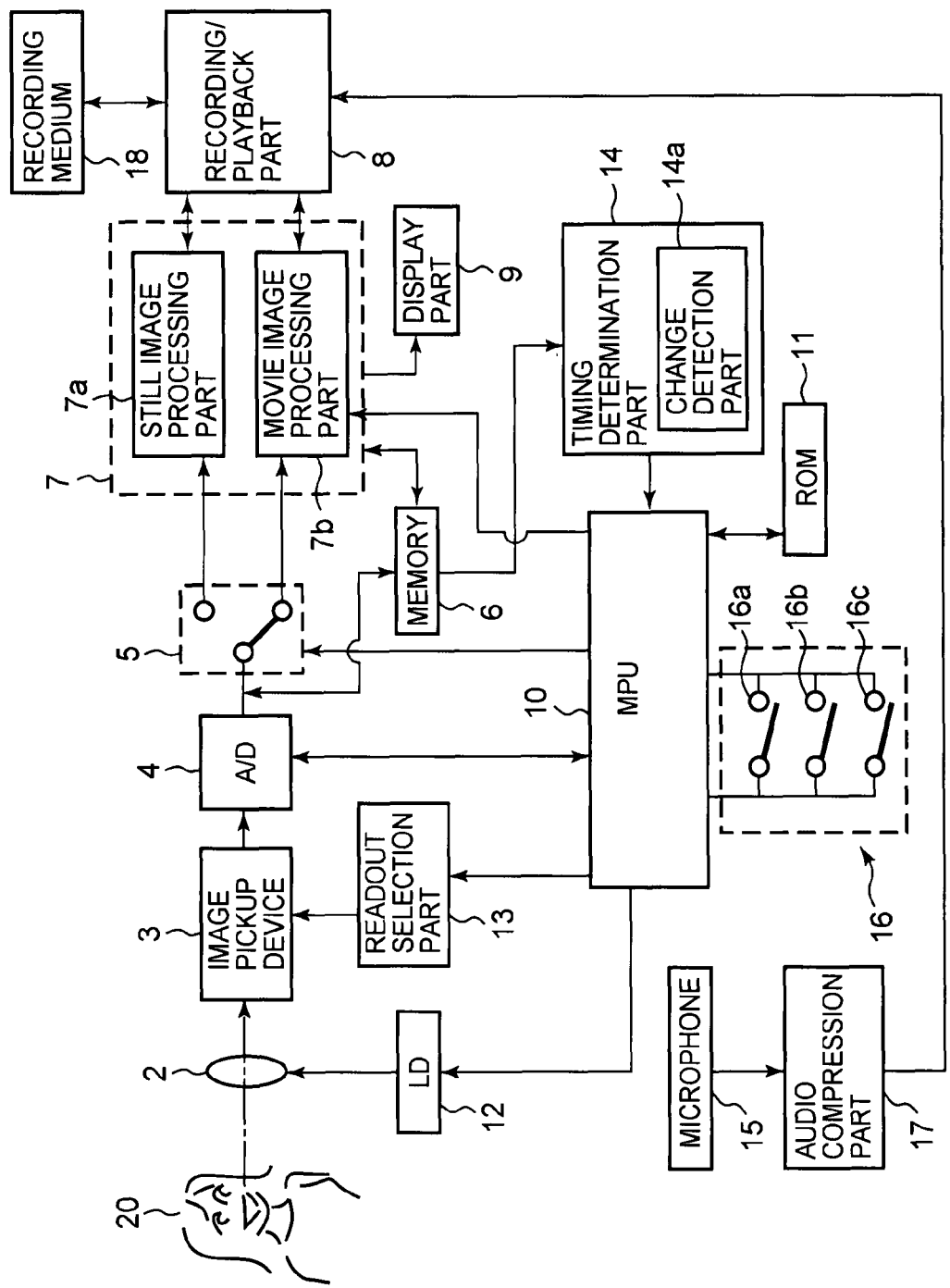
FIG. 1 is a general block diagram of a camera to which the present invention is adapted according to a first embodiment.

FIG. 1 is a general block diagram of the camera to which the invention is adapted. The camera is provided with a lens part 2, a lens drive (hereinafter "LD") part 12, an image pickup device 3, a readout selection part 13, an A/D conversion part 4, a changeover switch part 5, a memory 6, an image processing part 7, a recording/playback part 8, a display part 9, and a recording medium 18.

The lens part 2 forms the image of an input subject 20 onto the image pickup device 3. The LD part 12 controls the driving of the focusing lens of the lens part 2 to adjust the focus. The image pickup device 3, which includes a CCD or CMOS sensor, converts the formed subject image to an electrical signal.

The readout selection part 13 selects either an image signal for a movie image or an image signal for a still image to be output from the image pickup device 3. The image signal for a movie image is a signal from the image pickup device 3 whose pixels are thinned, while the image signal for a still image is a full-pixel signal from the image pickup device 3 whose pixels are not thinned at all or are slightly thinned. Accordingly, the number of pixels of the image signal for a movie image is smaller than the number of pixels of the image signal for a still image. When the number of pixels of the image pickup device is 10 million pixels, for example, the image signal for a still image has 10 million pixels equivalent to the entire pixels of the image pickup device (or slightly thinned, 5 million pixels), and the image signal for a movie image has 1 million pixels. The A/D conversion part 4 performs digital conversion of the selected image signal output from the image pickup device 3 and outputs the resultant signal as image data.

The changeover switch part 5 changes over paths for the image data output from the A/D conversion part 4 to an associated image processing part according to the type of the image data, namely, image data of a movie image or image data of a still image. The memory 6 serves as a buffer memory for temporarily storing still image data and movie image data as well as a working area for image processing.

The image processing part 7 has a still image processing part 7a and a movie image processing part 7b. The still image processing part 7a includes a circuit which executes gamma conversion, color process, sharpness process, etc. so that a still image has an image quality suitable for printing, a compression circuit (JPEG compression) for a still image which compresses the data size for recording, a circuit which plays back the recorded image, and a decompression circuit which decompresses the recorded image. The movie image processing part 7b includes a circuit which executes gamma conversion, color process, sharpness process, etc. for a movie image, a compression circuit for a movie image (e.g., MPEG compression) which compresses the data size for recording, a circuit which plays back the recorded image, and a decompression circuit which decompresses the recorded image.

The recording/playback part 8 records movie image data or still image data, which has been subjected to image processing in the image processing part 7, into the recording medium 18, reads and plays back movie image data or still image data from the recording medium 18 in playback mode. The recording/playback part 8 also records and plays back audio data as described later. The recording medium 18 is a saving memory constituted by a flash memory or the like. The display part 9 is a liquid crystal display provided on the back face of the camera or at a viewfinder, and displays the image of the subject 20 acquired by the image pickup device 3. The display part 9 displays a monitor image for checking the subject in shooting mode, and displays a recorded image (movie image, still image) subjected to the decompression process in playback mode.

The camera is further provided with an MPU (micro processing unit) 10, a ROM 11, a microphone part 15, an operation part 16, and an audio compression part 17. The MPU 10 is a computation control part which performs the general control of the camera including shooting and playback according to a program. The ROM 11 is a non-volatile and recordable memory (recording medium), e.g., a flash ROM, and stores a control program which executes camera processes. The operation part 16 notifies the MPU 10 of a camera user's instruction. The operation part 16 has switches 16a, 16b, 16c as a typical example thereof.

The microphone part 15 is used to record sounds in movie-image shooting mode. The audio compression part 17 compresses sounds detected by the microphone part 15 and sends the resultant audio data in the recording/playback part 8 in synchronism with a movie image.

The camera is provided with a timing determination part 14. The timing determination part 14 analyzes a continuous movie image or the contents of sounds thereof, and predicts and determines if an adequate still image can be shot immediately after shooting the movie image or when a given time passes thereafter. In analyzing a movie image, the timing determination part 14 analyzes image data reduced in size for a movie image and stored in the memory 6, and predicts the timing to shoot the subject as a still image to assist still image shooting. Because of its smaller image size, each image stored for a movie image in the memory 6 is also adequate for determining the state of the subject quickly.

The timing determination part 14 has a change detection part 14a. The change detection part 14a detects the difference between individual movie images having fewer pixels than pixels for still images or a change in sound, and analyzes a change in subject. The timing determination part 14 predicts the timing adequate for shooting from the result of the analysis. When the timing to shoot an adequate still image can be predicted from the movie image, the timing determination part 14 notifies the MPU 10 of the timing. The MPU 10 controls the readout selection part 13 and the changeover switch part 5 according to the notified timing.

In accordance with the result of the image determination, the MPU 10 controls the readout selection part 13 in such a way as to read an image signal for a still image from the image pickup device 3 at a predetermined timing, and controls the changeover switch part 5 to be set in the direction of the still image processing part 7a for the output still image data. Accordingly, reading and compression of a still image can be executed at the adequate timing. Still image shooting is executed automatically in response only to a timing instruction from the timing determination part 14. Alternatively, it also can be configured such that still image shooting is executed in response to the timing instruction from the timing determination only when the camera user instructs shooting with the operation part 16 during a predetermined period before and after the determined timing. The MPU 10 may detect a change in the contrast of the image at this timing and cause the LD part 12 to perform an autofocus operation. Because the determination of the timing to instruct shooting of a still image is important, its details will be given later.

Figure 2A:
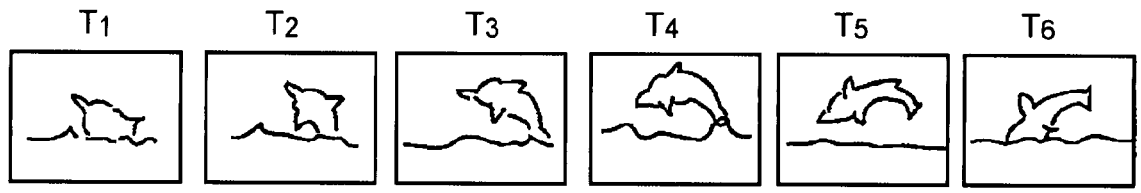
FIGS. 2A to 2C are diagrams illustrating examples of timings to shoot a still image of a moving subject according to the first embodiment.
Figure 2B:
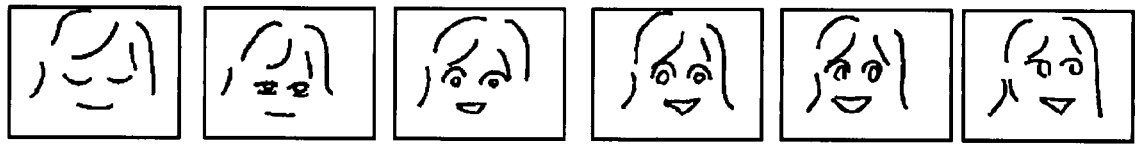
Figure 2C:
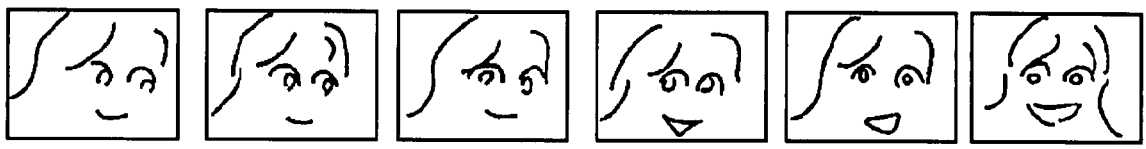

An example of the determination of the timing determination part 14 which determines the timing to shoot an image suitable for a still image will be described referring to FIGS. 2A to 2C. FIGS. 2A to 2C illustrate examples of the timings to shoot a still image of a moving subject. An image suitable for a still image is a momentary image in a fast moving subject.

FIG. 2A shows an example where the entire subject moves fast. This scene sequence shows a dolphin jumping out of water in a twinkle. The six images are extracted at given intervals (e.g., 1/15 sec) from a movie image which has been shot continuously, with the time (T1, T2, ..., T6) passing rightward. In FIG. 2A, it is the scenes T4 and T5 where the dolphin is jumping high that are desired to be taken as still images. Those scenes are however difficult to be captured properly by merely operating the release button of an ordinary camera. In the scene sequence as shown in FIG. 2A, therefore, the change detection part 14a of the timing determination part 14 analyzes changes in the images T1, T2, T3 which are recorded in the memory 6 one after another. When the timing determination part 14 determines that a change in the direction of the motion of the dolphin from an upward change to a horizontal change, the timing determination part 14 predicts the timing to shoot a still image based on the determination, and notifies the MPU 10 of the timing. This makes it possible to shoot a still image at the timing of the next moment, T4 or T5. In other words, the timing determination part 14 detects a change in the direction of the motion of a moving subject by analyzing the continuous movie image thereof, and determines the timing to shoot a still image based on the result of the detection.

FIG. 2B shows an example of shooting the face of a person. The six images, like those in FIG. 2A, are a part of a movie image taken at given intervals (e.g., 1/15 sec). In this example, the images of the subject whose eyes change from a closed state to an open state are determined. Let the image of T5 with the eyes fully opened be a preferable image as a still image. The change detection part 14a of the timing determination part 14 determines the time when approximately the same images are obtained at the timings of T3 and T4, and predicts that the next image (the image at the timing of T5) is an adequate image. The MPU 10 which is notified of the timing records the image of the next timing as a still image and executes still image shooting at the timing of T5. In other words, the timing determination part 14 detects the stillness of the motion of a moving subject by analyzing the continuous movie image thereof, and determines the timing to shoot a still image based on the result of the detection.

FIG. 2C shows an example of using a sound or voice of a subject to determine a timing to shoot a still image. In a case where a subject with an open mouth is preferable, the subject's voice can be used to determine a timing to shoot a still image. When the subject utters a voice at the timing of T4 in FIG. 2C, the microphone part 15 detects the voice at T4, and the change detection part 14a of the timing determination part 14 detects a change in voice in addition to an image change. The timing determination part 14 predicts from the voice change that the next timing of T5 is the adequate shooting moment. Based on the prediction, the MPU 10 executes still image shooting at the timing of T5. In other words, the timing determination part 14 detects a change in sound, and determines the timing to shoot a still image based on the result of the detection.

Procedures of recording a movie/still image which characterize the invention will be explained referring to timing charts in FIG. 3. In each timing chart, the period in which the level of a signal (high or low) becomes low indicates the operational timing. Chart A of FIG. 3 shows a read timing for a pixel signal to be read from the image pickup device 3 at a given period, chart B of FIG. 3 shows a timing for image determination to be executed by the timing determination part 14, chart C of FIG. 3 shows a timing for an image resizing process, chart D of FIG. 3 shows a timing for recording a movie image, chart E of FIG. 3 shows a timing for a camera user's instruction to shoot a still image, and chart F of FIG. 3 shows a timing for recording a still image.

In this example, the camera is set in a shooting mode for movie images and still images. One period of movie shooting is t3 (e.g., 1/60 sec), and reading of the image pickup device 3 is executed at an interval of (t3)/2 (e.g., 1/120 sec) (Chart A of FIG. 3). When a still image shooting instruction is given as a result of the determination made by the timing determination part 14 during reading of the image pickup device 3, still image shooting is executed (Chart F of FIG. 3).

Figure 3:
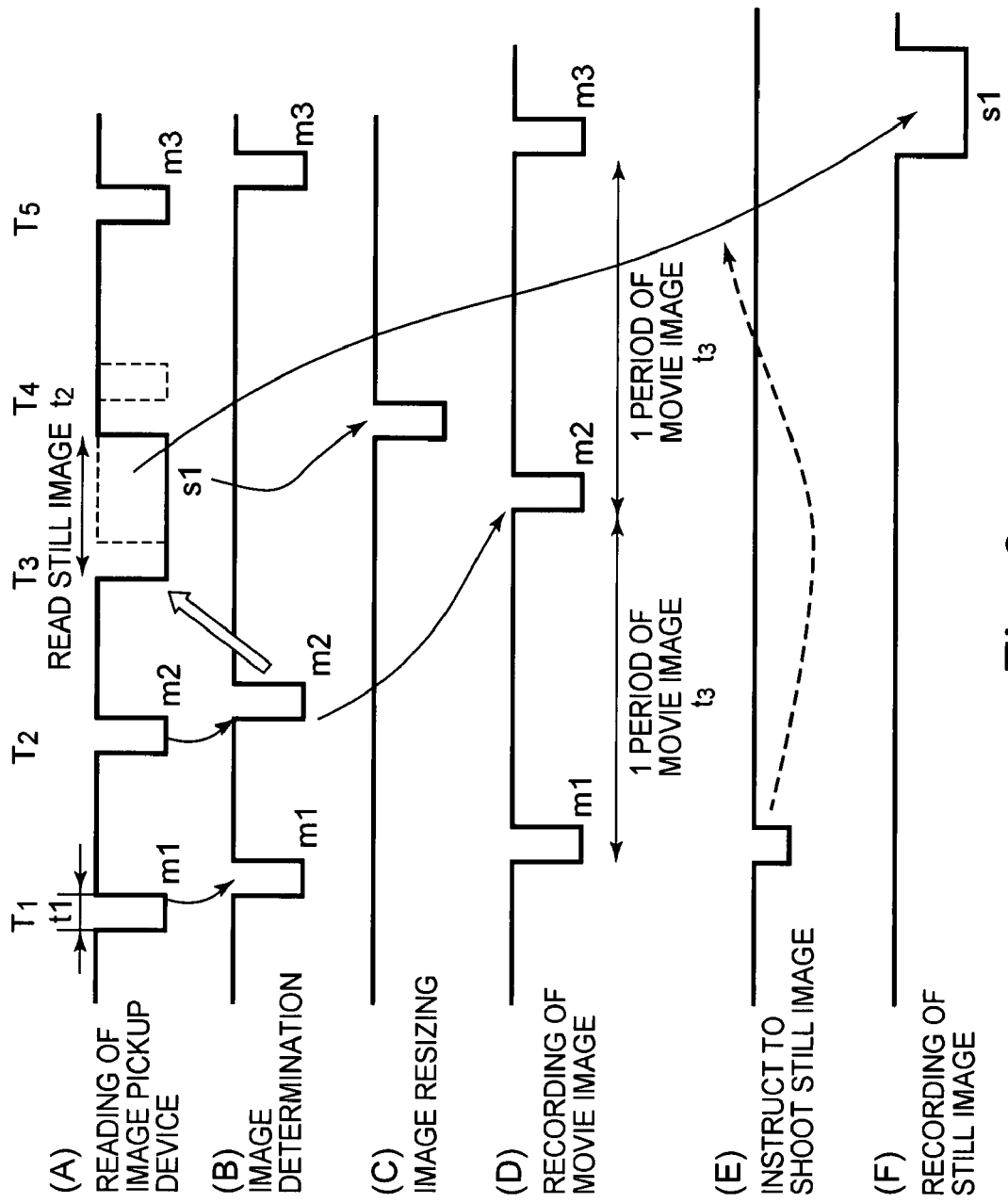
FIG. 3 is timing charts for image determination and still-image shooting which are performed during shooting of a movie image according to the first embodiment.

Images for a movie image are read out at a given timing (1/120 sec) of T1, T2, ... during a movie shooting (Chart A of FIG. 3). The read time for a movie image signal from the image pickup device 3 is t1. The illustration of the exposure timing prior to signal reading is omitted. Every other image signals (m1, m3, ...) of the read movie image are subjected to movie image processing, and recorded in the recording medium 18 by the recording/playback part 8 (Chart D of FIG. 3).

The timing determination part 14 determines if an adequate still image can be acquired at the next timing as a consequence of the movie image obtained at the previous timing. When the timing determination part 14 determines that an adequate still image can be acquired, the timing determination part 14 instructs the MPU 10 to shoot a still image. For example, image determination is performed every time, starting from the movie images acquired at the timings of T1, T2 (Chart B of FIG. 3), and when it is determined that there is a pausing by comparing the two images with each other as shown in chart B of FIG. 3, it is determined that the timing is suitable for shooting a still image. Because an adequate image often differs depending on a scene, the camera user may set the property of an adequate image beforehand. It is assumed in the embodiment that the camera is set in such a mode that an image immediately after a change is stopped is taken as an adequate image.

When the change detection part 14a detects that there is no change in each image for a movie image (m1, m2, ...) from the image pickup device 3, the timing determination part 14 determines that the next read timing of the image pickup device 3 is suitable for a still image. That is, the timing determination part 14 determines that the image at the next timing is adequate for a still image. In response to an instruction given from the MPU 10 as a result of the determination, the readout selection part 13 selects a mode to read multiple pixels (or all pixels) for a still image from the image pickup device 3. Then, still image shooting is executed at the timing of T3. An image s1 for a still image, which consists of multiple pixels, is read from the image pickup device 3. The read image s1 for a still image is temporarily stored in the memory 6 to be subjected to still image processing.

As mentioned above, if and only if a still image shooting instruction is given by the camera user before or after the determination, the read image for a still image is saved in the recording medium 18 in the embodiment. Suppose that the still image instruction is issued immediately prior to reading of the image s1 for a still image, as shown in chart F of FIG. 3. As shown in chart F of FIG. 3, in response to the still image shooting instruction, the MPU 10 adjusts a recording timing for the image s1 for a still image so as not to overlap the recoding timing for the move image, and record the image s1, which has been subjected to a process like compression in the still image processing part 7a, in the recording medium 18. The still image shooting instruction is valid even after reading of the image s1 for a still image. For example, the valid period for the scene specifying information can be set within one second before or after the reading of the image s1. If the camera user does not give the scene specifying information within one second before or after reading the image s1 for a still image, the still image is erased from the memory 6.

A time t2 (still image read time) needed to read the image s1 for a still image is generally longer than the time t1 needed to read each frame of a movie image. If t2 is long, there is a case where an image frame for a movie image which should be output at the timing of T3 cannot be output. In this case, an image m2 for a movie image for determination stored in the memory 6 is used as a movie image for recording (Chart D of FIG. 3). Otherwise, the image s1 for a still image at T3 may be resized to be a movie image for recording (Chart C of FIG. 3). However, a time lag originated from the time needed for the resizing process deviates the movie image write timing, thus making it necessary to compensate for the deviation. To keep a constant movie image shooting timing, the timing for still image reading may be delayed by one from T3 so that a still image is acquired at the timing of T4 which is not timing for acquiring a movie image frame for recording. Even when a still image signal which needs a long read time is read during shooting of a movie image, by using either one of the processes, images for a movie image are recorded at a constant period t3.

Figure 4:
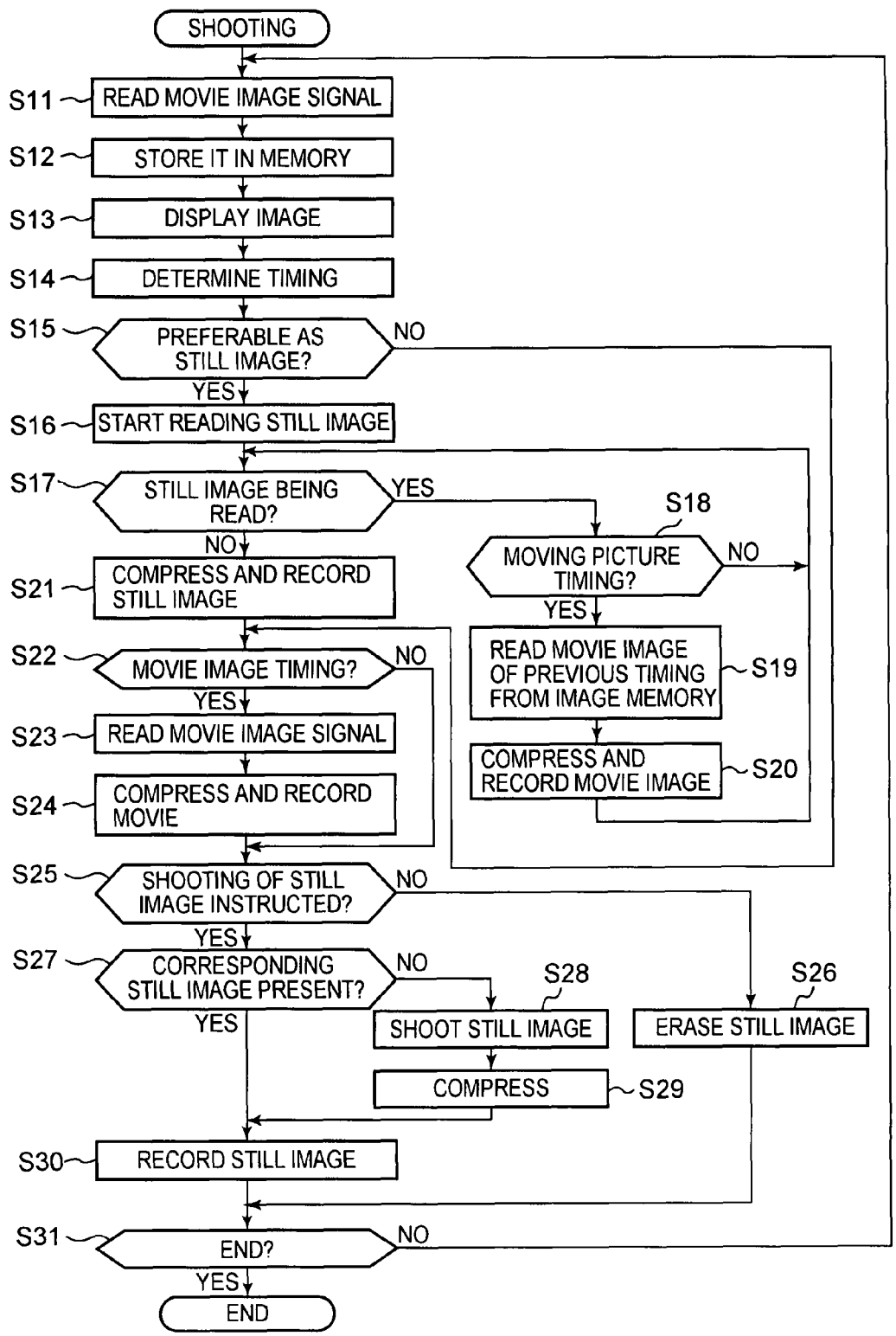
FIG. 4 is a flowchart for explaining the procedures of a shooting process of the camera of the first embodiment.

FIG. 4 is a flowchart for explaining the procedures of the shooting process that has been explained above referring to charts A to F of FIG. 3. It is assumed that, as in the case of charts A to F of FIG. 3, the camera is set to the shooting mode for still images and movie images. The shooting process is executed mainly by the MPU 10, the readout selection part 13, the timing determination part 14, the changeover switch part 5 and the image processing part 7 according to the program. First, the readout selection part 13 selects to read an image for a movie image. An image signal for a movie image consisting of fewer pixels, not an image for a still image consisting of larger number of pixels (or full pixels), is read from the image pickup device 3 (step S11). This is an image consisting of pixels which are equivalent in number to the pixels that are necessary to shoot a movie image of VGA or the like. The number of pixels is reduced from the full pixels by adding data of adjacent pixels (added reading) or thinning the pixels (thinned reading). The read image is subjected to A/D conversion, then is temporarily stored in the memory 6 (step S12). At the same time, the acquired image is displayed on the display part 9 (step S13).

The image stored in the memory 6 is input to the timing determination part 14. The change detection part 14a of the timing determination part 14 detects if the image has any motion as compared with the previous image, and detects in which direction the motion, if present, is changed. According to the detection result, the timing determination part 14 determines if it is the timing for shooting an adequate still image (step S14). The details of the determination will be described later referring to a flowchart in FIG. 5. The timing determination part 14 determines if the timing for acquiring a still image has come (step S15). When a desirable shooting timing comes (step S15: YES), the readout selection part 13 selects reading of a full-pixel image for a still image from the image pickup device 3. Then, reading the image for a still image from the image pickup device 3 is initiated (step S16).

During reading of the image for a still image (step S17: YES), it is determined if the timing for acquiring an image for a movie image has come (step S18). It is the timing of T3 in chart A of FIG. 3. When the timing for acquiring an image for a movie image comes during reading of the image for a still image (step S18: YES), an image for a movie image which has been acquired at the previous timing is read from the memory 6 for a replacement in the embodiment (step S19). The image is m2 in, for example, chart A and chart B of FIG. 3. The movie image is compressed by the movie image processing part 7b before being recorded in the recording medium 18 (step S20). This process prevent movie shooting from becoming discontinuous even if the movie shooting is interrupted by reading of a still image.

When reading of an image for a still image ends (step S17: Nb), the changeover switch part 5 causes the read image data to be output to the still image processing part 7a. The still image processing part 7a performs image processing and compression for the still image on the input image data (step S21). When acquisition of the still image ends, the timing for acquiring a movie image is determined again (step S22). When the timing for acquiring a movie image comes (step S22: YES), the readout selection part 13 selects outputting of an image for a movie image, so that an image of fewer pixels suitable for a movie image is read from the image pickup device 3 (step S23). This image is compressed and recorded (step S24). Then, it is determined if the user has given a still image shooting instruction within a predetermined period before or after acquisition of the still image (step S25). For example, the predetermined period is about 1 second. When the still image shooting instruction is not made by the user's operation of the release button (16a) or the like within the predetermined period (step S25: NO), it is considered that acquisition of a still image is not particularly requested, and the still image acquired and compressed is erased from the memory 6 without being recorded in the recording medium 18 (step S26). The movie recording is repeated until the user performs an operation to terminate the movie shooting (step S31).

When there is the still image shooting instruction (step S25: YES), on the other hand, it is determined if there is still image data acquired before or after the instructed timing (step S27). That is, it is determined if there is the still image whose acquisition has been determined as preferable and whose compression has been done in step S21. When there is the still image (step S27: YES), the still image data compressed in step S21 is recorded in the recording medium 18 (step S30). When there is no corresponding preferable still image (one compressed in step S21) (step S27: NO) even if the user has made the still image shooting instruction (step S25: YES), a still image is shot at this time (step S28), and compressed (step S29). Then, the compressed still image is recorded in the recording medium 18 (step S30). The shooting in step S28 is the normal shooting of a still image.

When it is not determined in step S15 that the timing is suitable for a still image (step S15: NO), the flow proceeds to step S22 where the above-explained movie image processing is performed. When the still image shooting instruction is made by the user (step S25: YES), the flow proceeds to step S28 for there is naturally no still image taken immediately before or after in step S27. Then, still image shooting (step S28) and image compression (step S29) are executed again as mentioned above. Then, the compressed image is recorded in the recording medium 18 (step S30). The above-described process is continued until the user makes an instruction to terminate shooting. The preferable level that is determined in step S15 may be variable.

Figure 5:
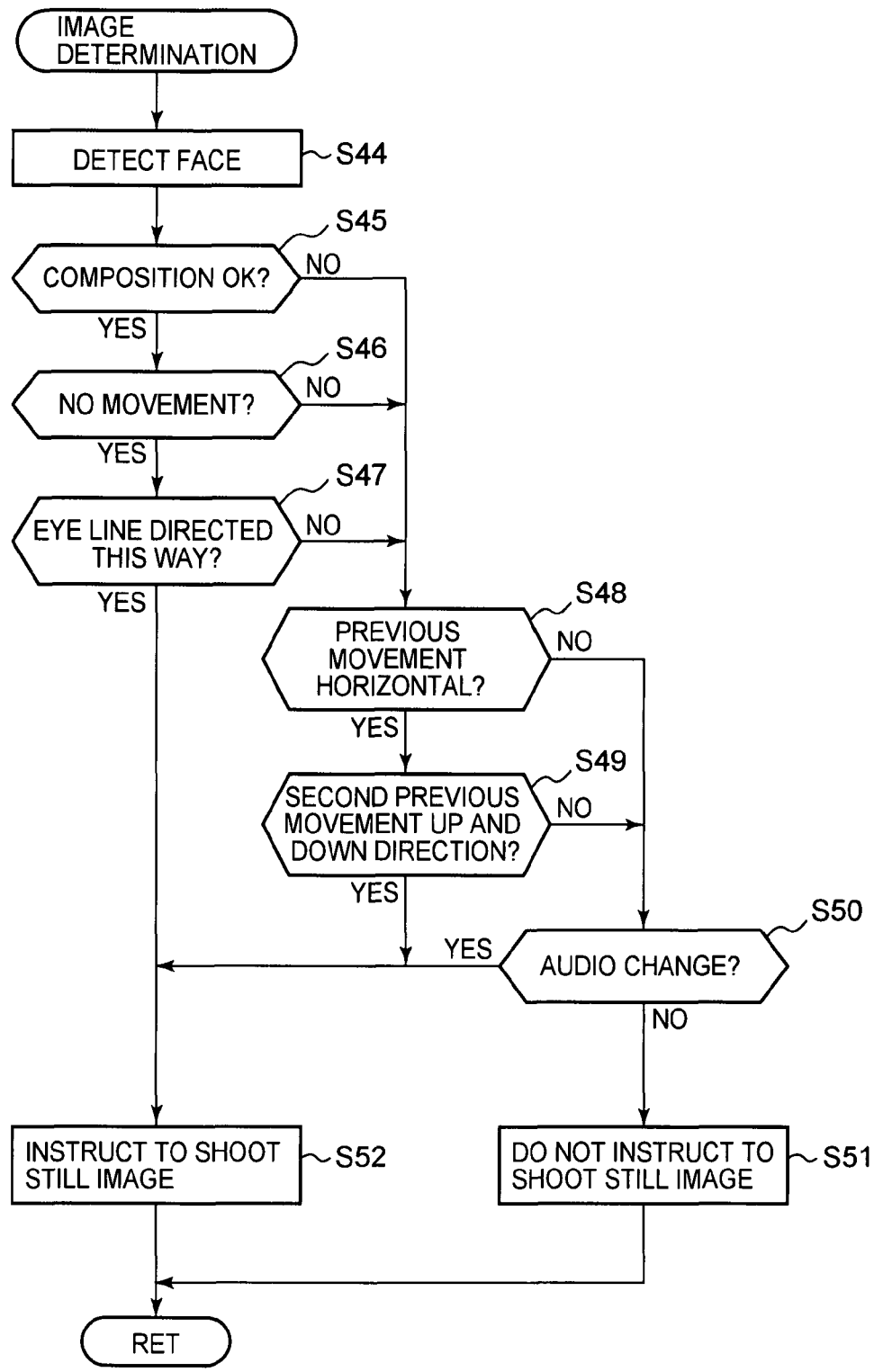
FIG. 5 is a flowchart for explaining the procedures of determining a scene preferable for a still image.

FIG. 5 is a flowchart for explaining one example of the procedures of a process of determining a scene preferable for a still image, and shows one example of the contents of step S15 in FIG. 4. The process is executed mainly by the MPU 10 which executes the program and the timing determination part 14.

A face detection is performed using the technique of determining from the features of a movie image stored in the memory 6 if a subject is a face (step S44). When the subject is a face, it is determined from the position and size of the face if the framing is proper (step S45). The determination is carried out by matching the position and size of the face with a predetermined template and evaluating the degree of matching.

When the framing is determined as proper (step S45: YES), the motion and the eye line of the subject are determined next (step S46, step S47). The motion of the subject is determined by, for example, by continuously shot movie images. The eye line of the subject is predicted by, for example, extracting the eye portion of the subject from the shot movie image through pattern recognition, and predicting the position of the iris with respect to the entire contour of the eye. When the subject does not move (step S46: YES) and the eye line of the subject is directed toward the camera (step S47: YES), it is the case of T4 in FIG. 2B, for example, and the above-described still image shooting is instructed (step S52).

When the face cannot be detected (step S45: NO), or when the condition in step S46 or step S47 is not satisfied, the flow proceeds to step S48 to detect the direction of the movement of the subject. For a scene (e.g., T3 in FIG. 2A) where the direction of the movement is changed as in the case where the direction of the previous movement is horizontal (step S48: YES) and the direction of the second previous motion is in the up and down direction (step S49: YES), still image shooting is likewise instructed (step S52). When the conditions of step S48 and step S49 are not satisfied, a change in sound is further referred to (step S50). When there is a sound change (step S50: YES), still image shooting is instructed (step S52). When none of the conditions are satisfied, still image shooting is not instructed (step S51).

Frequent capturing of still images is not desirable due to the energy consumption, the memory capacitance and the processing time. Because the camera of the embodiment assists the timing to capture a still image to ensure efficient capturing of the still image, the camera hardly misses the opportunity to get a nice shot without frequently capturing still images.

In the embodiment, a change in image data obtained by image shooting and reading which are repeatedly performed is detected to obtain an image suitable for a still image. This makes it possible to reduce missing of the opportunity to get a still image at a good timing originating from a delayed human operation or the mechanical time lag of the camera, or so.

The embodiment can provide a camera which can shoot a continuous movie image and a still image obtainable with a high quality at the same time without missing the opportunity to get a nice shot, by effectively using the image pickup device from which an image can be read at a high speed.

The embodiment can also provide a camera capable of obtaining a high-quality image suitable for a still image and shooting a movie image with a smooth motion at the same time. It is to be noted that shooting a live image for displaying it on the monitor of the camera is included in the scope of shooting a movie image.

Although a movie image as well as a still image is recorded in a recording medium in the foregoing description, this mode is not restrictive. For example, a movie image may be used only in predicting the timing to shoot a still image, and may not be recorded.

The foregoing description of the embodiment has been given of the case where the flowcharts in FIGS. 4 and 5 are executed by the combination of the software process done by the MPU 10 and the hardware, namely the timing determination part 14 and the readout selection part 13. This combination is not however restrictive, and the combination of the software process and the hardware process is a matter of design choice. The individual control processes to be executed by the MPU 10 are accomplished by supplying a software program stored in the ROM 11 as, a recording medium to the MPU 10 and executing the above-described operation according to the supplied program. Therefore, the software program itself realizes the functions of the MPU 10, and the recording medium storing this program is one aspect of the invention. As the recording medium, an optical recording medium, such as a CD-ROM or DVD, a magnetic recording medium such as MD, a tape medium, a semiconductor memory such as an IC card, and so forth can be used besides a flash memory. Although the foregoing description of the embodiment has been given of the case where the invention is adapted to a camera, the invention is not limited to this type, but may be adapted to the camera part of a cellular phone.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. A camera comprising:
    a determination part that determines a shooting timing suitable for a still image using an image signal output from an image pickup device at approximately a constant period;
    a selection part that selects a number of pixels to be read from the image pickup device; and
    a control part that controls the selection part in such a way that the selection part selects a number of pixels suitable for a still image which number is larger than the number of pixels for a moving image when the determination part determines that the shooting timing is suitable for a still image,
    wherein a lack of an image signal suitable for a moving image caused by the change of pixel numbers by the selection part is replaced with a previously acquired image signal suitable for a moving image.

2. A camera comprising:
    a selection part that selects a usage of an image signal output from an image pickup device from a still image and a movie image, and causes the image pickup device to output the image signal suitable for the selected usage such that a number of pixels suitable for a still image is larger than a number of pixels suitable for a moving image; and
    a determination part that determines a shooting timing suitable for a still image using the image signal output from the image pickup device,
    wherein the selection part outputs an image signal for a movie image at a time the determination part performs determination, and outputs an image signal for a still image when the determination part determines that the shooting timing is suitable for a still image, and
    wherein a lack of an image signal suitable for a moving image caused by the change of pixel numbers by the selection part is replaced with a previously acquired image signal suitable for a moving image.

3. The camera according to claim 2, further comprising a recording part that compresses and records at least one of the still image and the movie image selected by the selection part and output from the image pickup device.

4. A camera comprising:
- an image pickup device that reads an image at a given period interval;
- a selection part that selects a read image from an image of a first number of pixels suitable for a still image and an image of a second number of pixels suitable for a moving image, which is less than the first: number of pixels, from the image pickup device;
- a timing determination part that determines a timing to shoot an adequate image based on the image of the second number of pixels read from the image pickup device; and
- a control part that normally controls the selection part in such a way as to read an image of the second number of pixels from the image pickup device, causes the timing determination part to performs the timing determination based on the read image of the second number of pixels, and when the timing determination part determines that it is the timing for shooting an adequate image, controls the selection part in such a way as to read an image of the first number of pixels from the image pickup device at that timing,
- wherein a lack of an image signal suitable for a moving image caused by the change of pixel numbers by the selection part is replaced with a previously acquired image signal suitable for a moving image.

5. The camera according to claim 4, wherein the timing determination part determines a timing to shoot an image adequate for shooting a still image.

6. The camera according to claim 4, further comprising a microphone part for inputting voice, wherein the timing determination part performs the timing determination based also on a change in voice input from the microphone part.

7. The camera according to claim 4, wherein the control part controls to record an image of the first number of pixels read from the image pickup device at the timing for shooting an adequate image when there is a shooting instruction before or after the reading of the image.

8. The camera according to claim 4, further comprising:
- a still image processing part that performs image processing for a still image for an image read from the image pickup device;
- a movie image processing part that performs image processing for a movie image for an image read from the image pickup device; and
- a changeover part that changes over the still image processing part and the movie image processing part in such a way as to select the movie image processing part for an image of the second number of pixels read from the image pickup device and select the still image processing part for an image of the first number of pixels read from the image pickup device.

9. The camera according to claim 4, wherein the control part records an image of the second number of pixels read from the image pickup device as a movie image, and records an image of the first number of pixels read from the image pickup device as a still image.

10. A shooting control method for a camera having a selection part for selecting reading of an image from an image pickup device at a given interval from reading of an image of a first number of pixels suitable for a still image and reading of an image of a second number of pixels suitable for a moving image, which is less than the first number of pixels, the shooting control method comprising:
- reading the image of the second number of pixels and determining a timing to shoot an adequate image based on the read image of the second number of pixels; and
- reading the image of the first number of pixels from the image pickup device at the determined timing and recording the read image of the first number of pixels in a recording medium,
- wherein a lack of an image signal suitable for a moving image caused by the change of pixel numbers by the selection part is replacing with a previously acquired image signal suitable for a moving image.

11. The shooting control method according to claim 10, wherein recording of the image of the first number of pixels into the recording medium is executed when there is a shooting instruction before or after the reading of the image.

12. A computer readable recording medium recording a program to be executed by a computer of a camera having a selection part for selecting reading of an image from an image pickup device at a given interval from reading of an image of a first number of pixels suitable for a still image and reading of an image of a second number of pixels suitable for a moving image, which is less than the first number of pixels, the program allowing the computer of the camera to execute the steps of:
- reading the image of the second number of pixels;
- determining a timing to shoot an adequate image based on the read image of the second number of pixels;
- reading the image of the first number of pixels from the image pickup device at the determined timing; and
- recording the read image of the first number of pixels,
- wherein a lack of an image signal suitable for a moving image caused by the change of pixel numbers by the selection part is replaced with a previously acquired image signal suitable for a moving image.

13. A shooting control method for a camera capable of shooting both a movie image and a still image such that a number of pixels suitable for a still image is larger than a number of pixels suitable for a moving image, the shooting control method comprising:
- reading an image for a movie image from an image pickup device;
- determining based on the read image for a movie image whether or not an image suitable for shooting a still image can be shot immediately after the reading; and
- performing such control as to read an image for a still image from the image pickup device at a timing determined that an image suitable for shooting a still image can be shot immediately after the reading,
- wherein a lack of an image signal suitable for a moving image caused by the change of pixel numbers by the selection part is replaced with a previously acquired image signal suitable for a moving image.

14. A computer readable recording medium recording a program which allows a computer to execute a shooting control method for a camera capable of shooting both a movie image and a still image such that a number of pixels suitable for a still image is larger than a number of pixels suitable for a moving image, the program allowing the computer of the camera to execute the steps of:
- reading an image for a movie image from an image pickup device;
- determining based on the read image for a movie image whether or not an image suitable for shooting a still image can be shot immediately after the reading; and
- performing such control as to read an image for a still image from the image pickup device at a timing determined that an image suitable for shooting a still image can be shot immediately after the reading,
- wherein a lack of an image signal suitable for a moving image caused by the change of pixel numbers by the selection part is replaced with a previously acquired image signal suitable for a moving image.

15. The camera according to claim 1, wherein the shooting timing determined is a time when still image capture and readout is to be initiated.

16. The camera according to claim 2, wherein the shooting timing determined is a time when still image capture and readout is to be initiated.

17. The camera according to claim 4, wherein the determined timing to shoot is a time when still image capture and readout is to be initiated.

18. The camera according to claim 10, wherein the determined timing to shoot is a time when still image capture and readout is to be initiated.

19. The camera according to claim 12, wherein the determined timing to shoot is a time when still image capture and readout is to be initiated.

20. The camera according to claim 13, wherein the timing determined that an image suitable for shooting a still image can be shot immediately after the reading is a time when still image capture and readout is to be initiated.

* * * * *